(12) United States Patent
Merkley et al.

(10) Patent No.: US 8,317,437 B2
(45) Date of Patent: Nov. 27, 2012

(54) ADAPTIVE POSITIVE FEED DRILLING SYSTEM (75) Inventors: Alan R. Merkley, Greenbank, WA (US); Ronald W. Outous, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 1153 days.

(21) Appl. No.: 12/184,337

(22) Filed: Aug. 1, 2008

(65) Prior Publication Data
US 2010/0025107 A1 Feb. 4, 2010

(51) Int. Cl.
*B23B 39/08* (2006.01)

(52) U.S. Cl. ............... 408/9; 408/12; 408/56; 408/124

(58) Field of Classification Search ............ 408/8, 9, 408/12, 56, 124; B23B 39/08
See application file for complete search history.

(56) References Cited

U.S. PATENT DOCUMENTS

| 3,821,921 | A | * | 7/1974 | Rosenberg | 409/80 |
|---|---|---|---|---|---|
| 3,995,969 | A | * | 12/1976 | Fleming | 408/12 |
| 4,688,970 | A | | 8/1987 | Eckman | |
| 4,807,587 | A | * | 2/1989 | Baetschmann et al. | 125/1 |
| 4,822,215 | A | * | 4/1989 | Alexander | 408/9 |
| 4,881,858 | A | * | 11/1989 | Volk et al. | 409/218 |
| 5,022,798 | A | | 6/1991 | Eckman | |
| 5,116,168 | A | * | 5/1992 | Aihara | 408/1 R |
| 5,613,810 | A | * | 3/1997 | Bureller | 408/3 |
| 5,677,515 | A | * | 10/1997 | Selk et al. | 174/255 |
| 5,802,937 | A | * | 9/1998 | Day et al. | 82/1.11 |
| 6,343,900 | B1 | | 2/2002 | Bruno | |
| 6,665,948 | B1 | * | 12/2003 | Kozin et al. | 33/833 |
| 6,964,546 | B1 | * | 11/2005 | Vakil | 408/110 |
| 7,096,555 | B2 | * | 8/2006 | Tourne et al. | 29/402.06 |
| 7,351,018 | B2 | * | 4/2008 | Oden et al. | 409/131 |
| 2001/0047219 | A1 | * | 11/2001 | Oden | 700/159 |
| 2004/0049311 | A1 | | 3/2004 | Kuntze et al. | |
| 2005/0230130 | A1 | | 10/2005 | Strasser et al. | |
| 2009/0129877 | A1 | * | 5/2009 | Brady | 408/16 |
| 2009/0297284 | A1 | * | 12/2009 | Brown et al. | 408/3 |

FOREIGN PATENT DOCUMENTS

EP 0339659 A 11/1989
WO 2006077340 A 7/2006

OTHER PUBLICATIONS

PCT International Search Report for PCT/US2009/048100 dated Nov. 12, 2009.
Sun, "Tips for Successful PID Tuning", Galil Motion Control, Inc., Rocklin CA, retrieved Jun. 18, 2008 http://www.galilmc.com/literature/servotrends/april02/st_tuning_article.pdf.

* cited by examiner

*Primary Examiner* — Eric A Gates
(74) *Attorney, Agent, or Firm* — Yee & Associates, P.C.

(57) ABSTRACT

An apparatus for a drilling operation. In one advantageous embodiment, the drilling operation includes a motor, a rotary sensor, and a controller connected to the rotary sensor. The rotary sensor may be capable of generating a signal in response to rotary movement of the drill motor. The controller may be capable of monitoring a speed of the air motor from the signal generated by the rotary sensor and may be capable of identifying a change from a current layer in a stackup to a new layer in the stackup using the signal.

9 Claims, 10 Drawing Sheets

ADAPTIVE POSITIVE FEED DRILLING SYSTEM

BACKGROUND INFORMATION

1. Field

The present disclosure relates generally to manufacturing and in particular, to a method and apparatus for drilling holes in objects. Still more particularly, the present disclosure relates to a method and apparatus for adaptively drilling holes in objects with different types of layers.

2. Background

Manufacturing may involve the use of tools and/or labor to create items for use or sale. In aerospace manufacturing, these items may include, for example, without limitation, aircraft, aircraft parts, missiles, rockets, and/or spacecraft. In manufacturing various items, a number of different operations may be performed. These operations may include, for example, without limitation, extrusion, pressing, rolling, piercing, machining, drilling, routing, and curing.

With respect to drilling, a drill may be used to create holes or channels that may be cylindrical in solid materials. A drill may be a tool with a rotating section that may hold a drill bit to drill holes. A drill bit may be a cutting tool that may be used to create holes in an object. These holes may be cylindrical or non-cylindrical depending on the particular implementation. Drilling may involve drilling a channel, such as, for example, without limitation, a cylindrical hole.

One type of drill that may be used for drilling holes is a drill with a positive feed feature. This positive feed feature may allow the drill to push the drill bit into the object, while drilling occurs. Drills also may have a peck and feed feature used to push the drill bit into the object and then retract the drill bit while drilling occurs. This type of forward and reverse motion of the drill bit may provide for a cleaner quality hole. Further, this type of drilling also may reduce the amount of heat applied to the object, which also may increase the quality of the hole. Also, this type of drilling may reduce erosion in a carbon fiber reinforced plastic when the carbon fiber reinforced plastic is the first layer and titanium is the second layer.

Currently available drills may include, for example, without limitation, pneumatic drills. Compressed air and an air valve may be used to rotate the drill and move the drill forward and to retract the drill. This type of drilling is also referred to as a "peck feed" or "peck and feed" process. With the forward and reverse movement of the drill bit, air valves are used to shift the direction of the airflow back and forth to move the drill bit forward and backward within the hole.

This type of drilling may be performed into an object containing layers of different types of materials. These layers of different types of materials may be referred to as a stackup. These different layers may have different levels of hardness that may require different drilling speeds. For example, a stackup may include a layer of carbon fiber reinforced plastic (CFRP) and a layer of titanium. The titanium layer may be harder than the carbon fiber reinforced plastic layer. The titanium layer may require a drilling speed and/or feed rate that is slower than that for the carbon fiber reinforced plastic layer.

Currently, positive feed drilling of a stackup containing different layers may be limited in speed and/or feed rate by the hardest layer in the stackup. Physically, the carbon fiber reinforced plastic layers in a stack may be, for example, without limitation, two times the thickness of the titanium layers within the stackup. When performing drilling operations based on the speed and/or feed rate for the titanium layers, a considerable amount of time may be wasted in drilling the carbon fiber reinforced plastic layers at the slower speeds.

Therefore, it would be advantageous to have a method and apparatus that overcomes the problems described above as well as other problems.

SUMMARY

The advantageous embodiments provide a method, apparatus, and computer program product for a drilling operation. In one advantageous embodiment, the drilling operation may comprise a motor, a rotary sensor, and a controller connected to the rotary sensor. The rotary sensor may be capable of generating a signal in response to rotary movement of the drill motor. The controller may be capable of monitoring a speed of the motor from the signal generated by the rotary sensor and may be capable of identifying a change from a current layer in a stackup to a new layer in the stackup using the signal.

In another advantageous embodiment, the drilling apparatus may comprise an air motor, an air supply unit connected to the air motor, a rotary sensor, a proportional flow valve, a proportional-integral-derivative controller, a spindle, a drill bit, and a lubrication unit. The air supply unit may be capable of powering the air motor. The rotary sensor may comprise a hall effect transistor and a set of magnets, wherein the rotary sensor may be capable of generating a signal in response to rotary movement of the air motor and may be capable of detecting the rotary movement in revolutions per minute. The proportional flow valve may be located in the air supply unit and connected to the controller. The proportional-integral-derivative controller may be connected to the rotary sensor and the proportional flow valve, wherein the proportional-integral-derivative controller may be capable of monitoring a speed of the air motor from the signal generated by the rotary sensor. An error may be identified between an actual speed of the air motor and a desired speed of the air motor, a change may be identified from a current layer in a stackup to a new layer in the stackup based on the error and a base value for the error, and the proportional flow valve in the air supply unit may be controlled to change the actual speed towards the desired speed. The spindle may be connected to the air motor. The drill bit may be connected to the spindle. The lubrication unit may be capable of supplying the lubrication fluid to the drill bit and capable of being controlled by the proportional-integral-derivative controller.

In yet another advantageous embodiment, a method for performing a drilling operation may be present. A signal may be monitored that indicates a rotary movement of a spindle system. An actual speed of the spindle system may be identified from the signal. An error may be identified between the actual speed of the spindle system and a desired speed of the spindle system by comparing an average error and a current error to form a comparison. A change from a current layer in a stackup to a new layer in the stackup may be identified based on the comparison.

In still yet another advantageous embodiment, a signal may be monitored indicating a rotary movement of a spindle system. An actual speed of the spindle system may be identified from the signal. An error may be identified between the actual speed of the spindle system and a desired speed of the spindle system. The base may be identified as an average of a set of error values in a layer in the stackup. A determination may be made as to whether a difference between the error and the base is greater than a threshold value. A change from a current layer in a stackup to a new layer in the stackup may be identified by if the error and the base are greater than the threshold value. In response to identifying the change from the current layer in the stackup to the new layer in the stackup, a new desired speed may be selected for the spindle system.

In still yet another advantageous embodiment, a computer program product may contain program code on a computer recordable storage medium. Program code may be present for monitoring a signal indicating a rotary movement of a spindle system. Program code may also be present for identifying an actual speed of the spindle system from the signal. Program code may be present for identifying an error between the actual speed of the spindle system and a desired speed of the spindle system. Program code may be present for identifying a change from a current layer in a stackup to a new layer in the stackup based on the error.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
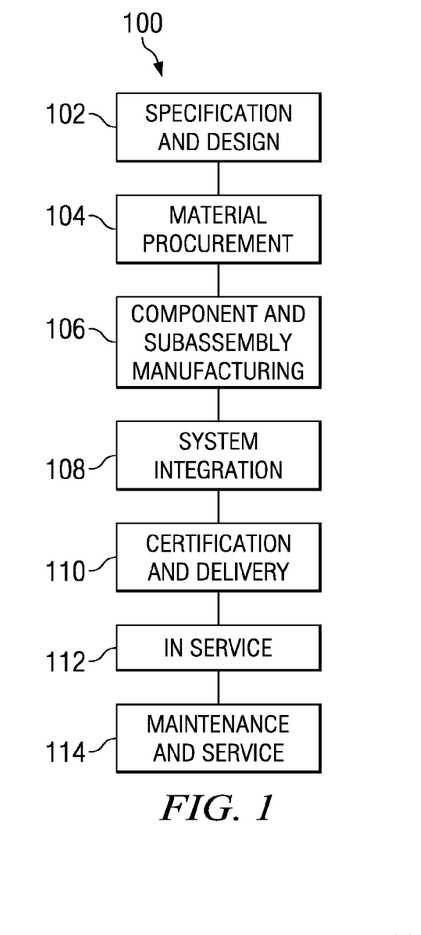
FIG. 1 is a diagram illustrating an aircraft manufacturing and service method in which an advantageous embodiment may be implemented.
Figure 2:
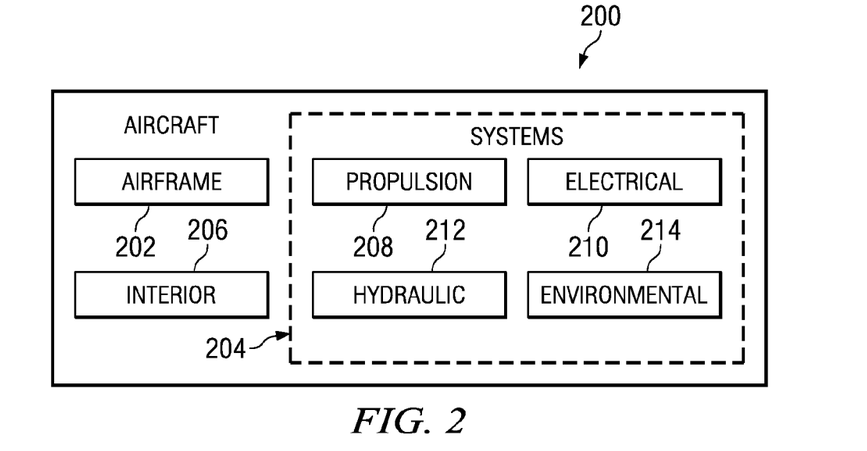
FIG. 2 is a diagram of an aircraft in which an advantageous embodiment may be implemented.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, a diagram illustrating an aircraft manufacturing and service method is depicted in accordance with an advanta geous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

As an illustrative example, an apparatus, method, and computer program product in accordance with an advantageous embodiment may be used to drill a hole within various components utilized within aircraft 200. The hole may be drilled into a stackup. The stackup may contain layers of different types of materials for a single component or for multiple components.

The different advantageous embodiments recognize and take into account that a drilling apparatus may be employed with a control system to drill different materials at the appropriate speeds and/or feed rates to minimize and/or reduce wasted drilling time. The different advantageous embodiments recognize and take into account that these types of tools may detect the type of material hardness based on recorded thrust measurements made during drilling and may shift drilling parameters without knowing the thickness of the materials being drilled. The different advantageous embodiments also recognize and take into account that these types of systems may only provide a limited number of speeds and require time to be reconfigured for different types of materials when different types of objects are drilled.

The different advantageous embodiments recognize and take into account that these types of drilling apparatus may rely on a load cell for feedback to the control system to identify the drilling thrusts. The different advantageous embodiments recognize and take into account that load cell technology may be accurate for determining thrust levels, but these types of systems may be too expensive and/or delicate to survive and/or last in a manufacturing environment.

Thus, the different advantageous embodiments may provide a drilling apparatus that has a motor, a rotary sensor, and a controller. The rotary sensor may be capable of generating a signal in response to detecting rotary movement of the spindle and/or motor. In these examples, the controller may be connected to the rotary sensor in which the controller may be capable of monitoring a speed of the motor from the signal generated by the rotary sensor. Further, the controller may be capable of identifying an error between the actual speed of the spindle and a desired speed for the spindle and identify change from a current layer in a stackup to a new layer in a stackup based on the error.

Figure 3:
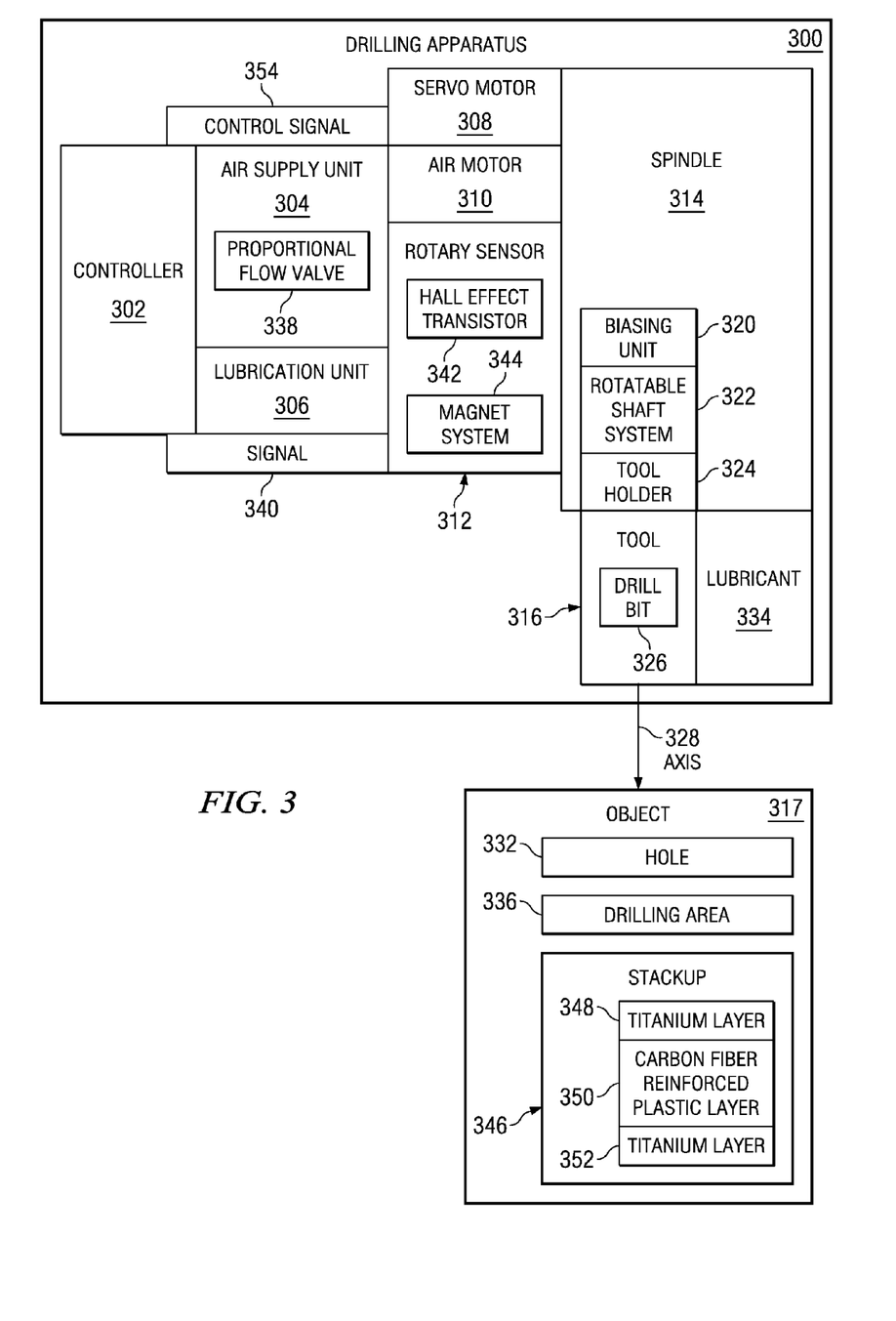
FIG. 3 is a diagram of a drilling apparatus in accordance with an advantageous embodiment.

With reference now to FIG. 3, a diagram of a drilling apparatus is depicted in accordance with an advantageous embodiment. Drilling apparatus 300 includes controller 302, air supply unit 304, lubrication unit 306, air motor 310, rotary sensor 312, spindle 314, and tool 316.

Tool 316 may be attached to spindle 314. Spindle 314 may be attached to air motor 310. A motor 310 may cause spindle 314 to rotate, which in turn may rotate tool 316 to drill object 317. Spindle 314 includes biasing unit 320, rotatable shaft system 322, and tool holder 324. Tool holder 324 may hold tool 316, which may take the form of drill bit 326 in these examples. Biasing unit 320 may move rotatable shaft system 322 and tool holder 324 along the direction of the axis 328. In this manner, biasing unit 320 may cause spindle 314 to move axially along axis 328. Rotatable shaft system 322 may rotate tool 316 around axis 328.

Biasing unit 320 may provide a mechanism to move spindle 314 back and forth with tool 316 along axis 328 to perform various operations. These operations include, for example, without limitation, positive feed, peck and feed drilling, drilling and countersinking, and other suitable operations.

With a positive feed operation, spindle 314 may move tool 316 into object 317 to drill hole 332 in object 317. The movement of spindle 314 may move tool 316 towards and/or away from object 317. This type of axial movement of spindle 314 along axis 328 may be, for example, without limitation, a peck and feed operation.

Biasing unit 320 may be implemented using any mechanism that moves tool 316 along axis 328. In these examples, biasing unit 320 may take the form of a ball screw mechanism that has a nut and screw. Biasing unit 320 may be controlled by air motor 310. Air motor 310 may operate biasing unit 320 to perform the different drilling operations.

Rotatable shaft system 322 may be implemented using any mechanism that can rotate tool holder 324 about axis 328 and move axially along axis 328. Rotatable shaft system 322 may include, for example, without limitation, a ball spine, a mechanical spine, a gearing mechanism, a keyed shaft, or other suitable devices to transfer torque and/or rotation to spindle 314.

In these examples, the torque and/or rotation may be generated by air motor 310. Air motor 310 may rotate rotatable shaft system 322. The speed at which rotatable shaft system 322 turns may vary depending on the air supplied to air motor 310 by air supply unit 304. By changing the amount of air supplied by air supply unit 304, air motor 310 may turn rotatable shaft system 322 at different speeds.

Lubrication unit 306 may provide lubrication for drilling object 317. In these examples, lubrication unit 306 may provide lubricant 334 to drill bit 326. In turn, lubricant may be applied to drilling area 336 by drill bit 326 during drilling operations.

In these examples, controller 302 may control air supply unit 304, biasing unit 320, and/or lubrication unit 306. In the different advantageous embodiments, air supply unit 304 may include proportional flow valve 338. The different advantageous embodiments recognize that currently available air supply units may not include proportional flow valve 338.

Currently available air supply units may not include proportional flow valve 338. Instead, currently available air supply units may use a valve that has an on or off position.

The different advantageous embodiments employ proportional flow valve 338 to provide an ability to control the speed of air motor 310, which in turn may control the speed at which drill bit 326 turns to perform drilling operations on object 317. The different advantageous embodiments use proportional flow valve 338 to control the speed of air motor 310 in contrast to currently used techniques. For example, without limitation, currently used techniques may involve using a gear reduction system connecting air motor 310 to rotatable shaft system 322.

In these examples, rotary sensor 312 may generate signal 340 in response to detecting the rotation of rotatable shaft system 322. Rotary sensor 312 may include hall effect transistor 342 and magnet system 344. Magnet system 344 may be, for example, without limitation, a set of magnets. A set as used herein refers to one or more items. Magnet system 344 may be attached to rotatable shaft system 322. As rotatable shaft system 322 turns, hall effect transistor 342 detects the movement of magnet system 344 to generate signal 340.

These components in rotary sensor 312 may be an example of an encoder system. Of course, magnet system 344 may be attached or connected to other components within spindle 314 to detect rotation of various components of drilling apparatus 300 around axis 328.

In these examples, object 317 may be stackup 346. Stackup 346 may include, for example, without limitation, titanium layer 348, carbon fiber reinforced plastic layer 350, and titanium layer 352. For example, without limitation, as drill bit 326 drills through titanium layer 348, rotary sensor 312 may generate control signal 354, which may be detected by controller 302. Controller 302 may send control signal 354 to air supply unit 304, biasing unit 320, and/or servo motor 308 to control the drilling speed and/or feed rate, while drill bit 326 is drilling titanium layer 348.

For example, if the speed of rotatable shaft system 322 slows down, this slower rotation of rotatable shaft system 322 may be detected by rotary sensor 312, which may send this information in signal 340 to controller 302. In turn, controller 302 may send control signal 354 to air supply unit 304 to increase the air supply to air motor 310 to increase the speed of rotatable shaft system 322.

In another example, if drill bit 326 drills through titanium layer 348 and reaches carbon fiber reinforced plastic layer 350, rotatable shaft system 322 may then rotate at a faster speed. This increase in speed may be caused by the softer material to drill through within carbon fiber reinforced plastic layer 350. This faster speed may be detected by rotary sensor 312 with the information being sent in signal 340 to controller 302. The change in speed may be detected by controller 302 and identified as a change in layers in stackup 346.

In the different advantageous embodiments, the controller 302 may identify change in layers based on the delta or difference between drilling speeds rather than using absolute drilling speeds. More specifically, controller 302 identifies an error between the desired speed and the actual speed. This error may be compared with a base to determine whether a change in layers has occurred during drilling.

In these examples, the error is the current error that is detected. The base is an average of some selected number of error values. In these examples, this error may be identified using an encoder or sensor such as rotary sensor 312. The use of the difference between the error and the base may take into account that drill bit 326 may drill through a particular layer in stackup 346 at a different speed during a drilling operation due to various factors.

For example, without limitation, wear and tear on drill bit 326, wear within rotatable shaft system 322, and other factors may change the actual speed at which drill bit 326 drills through a particular layer within stackup 346.

Thus, by detecting the difference in error rather than using absolute drilling speeds, these error changes in drilling apparatus 300 may be taken into account in a manner that may accurately reflect when changes in layers are detected.

The illustration of drilling apparatus 300 in FIG. 3 is provided for demonstrating different features of the different advantageous embodiments. The illustration of drilling apparatus 300 is not intended to imply physical or architectural limitations to the manner in which drilling apparatus 300 may be implemented. For example, without limitation, in other advantageous embodiments, drilling apparatus 300 may use an electric motor instead of air motor 310.

Further, different components may be combined together within the same physical housings or locations depending on the particular implementation. For example, lubrication unit 306 and controller 302 may be attached to each other in a single housing or may be located in separate housings.

In other advantageous embodiments, drilling apparatus 300 may be used to drill through other types of layers other than titanium and carbon fiber reinforced plastic layers. For example, without limitation, drilling apparatus 300 may be used to drill through layers of materials such as, for example, without limitation, ceramic, aluminum, steel, metal alloys, other types of composite materials, and other suitable materials for layers in a stackup.

Additionally, object 317 may be, for example, without limitation, a wing joint, a skin panel and support structure, a skin panel in a rib, a solar panel, or some other suitable part or set of parts.

Figure 4:
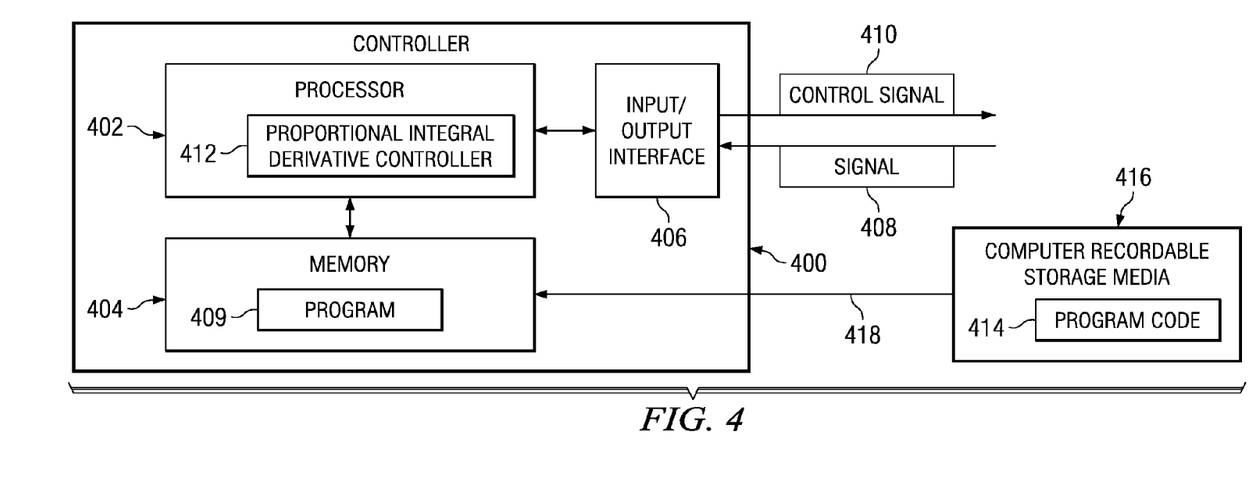
FIG. 4 is a diagram of a controller is depicted in accordance with an advantageous embodiment.

With reference now to FIG. 4, a diagram of a controller is depicted in accordance with an advantageous embodiment. In this example, controller 400 may be an example of one manner in which controller 302 in FIG. 3 may be implemented.

In this example, controller 400 may include processor 402, memory 404, and input/output interface 406. Input/output interface 406 may receive and send signals such as signal 408 and control signal 410. Signal 408 may be received from a component such as, for example, rotary sensor 312 in FIG. 3. Signal 408 may indicate the rotation of a shaft, spindle, or other component in a drilling apparatus. Control signal 410 may be a value based on an encoder. Signal 408 may be used to identify an error value. This error value is also referred to as an encoder error in this example. The encoder error is the difference between the expected rotation versus the actual rotation of the spindle and/or drill bit. Control signal 410 may be generated by processor 402 and sent to a component such as, for example, without limitation, air supply unit 304, and lubrication unit 306 in FIG. 3 through input/output interface 406.

Input/output interface 406 may take various forms. For example, without limitation, this interface may be a buffer, an inverter, a universal serial bus, or some other suitable interface. Processor 402 may be, for example, a processor, an application specific integrated circuit (ASIC), or some other suitable device. Processor 402 in these examples may include proportional integral derivative controller 412 which may take the form of program code or circuits within processor 402. Processor 402 may receive signal 408 and generate control signal 410. Processor 402 may identify a change in error based on receiving signal 408.

The change in error may be processed by proportional integral derivative controller 412 to generate control signal 410 to change or move the current speed to a desired speed. The desired speed may be a speed for a particular layer. In these examples, the different speeds may be identified using program 409. In these examples, program 409 may identify desired drilling speeds for particular types of layers.

Further, processor 402 may use detection of changes in drilling speed to determine when a change in a layer has occurred. For example, without limitation, if the error changes by more than some threshold amount, a new layer may be identified.

In these examples, program 409 may be placed into memory 404 by transferring program code 414 stored on computer recordable storage media 416 to memory 404 as shown by arrow 418. This transfer may occur, for example, without limitation, by connecting computer recordable storage media 416 to memory 404, sending program code 414 to memory 404 from computer recordable storage media by a wired or wireless connection, and/or through some other suitable transfer mechanism. In these examples, computer recordable storage media 416 may take various forms. For example, without limitation, computer recordable storage media 416 may be a hard disk drive, a compact disk, a flash memory, magnetic tape, a video versatile disk, or some other suitable media that may store and hold program code 414.

The illustration of controller 400 in FIG. 4 is provided as an example of one implementation for a controller and not meant to imply architectural or physical limitation as a manner in which controller 400 may be implemented. For example, without limitation, other components may be used to control controller 400 in addition or in place of the ones illustrated in FIG. 4. For example, controller 400 also may include a network interface or wireless communications unit.

Figure 5:
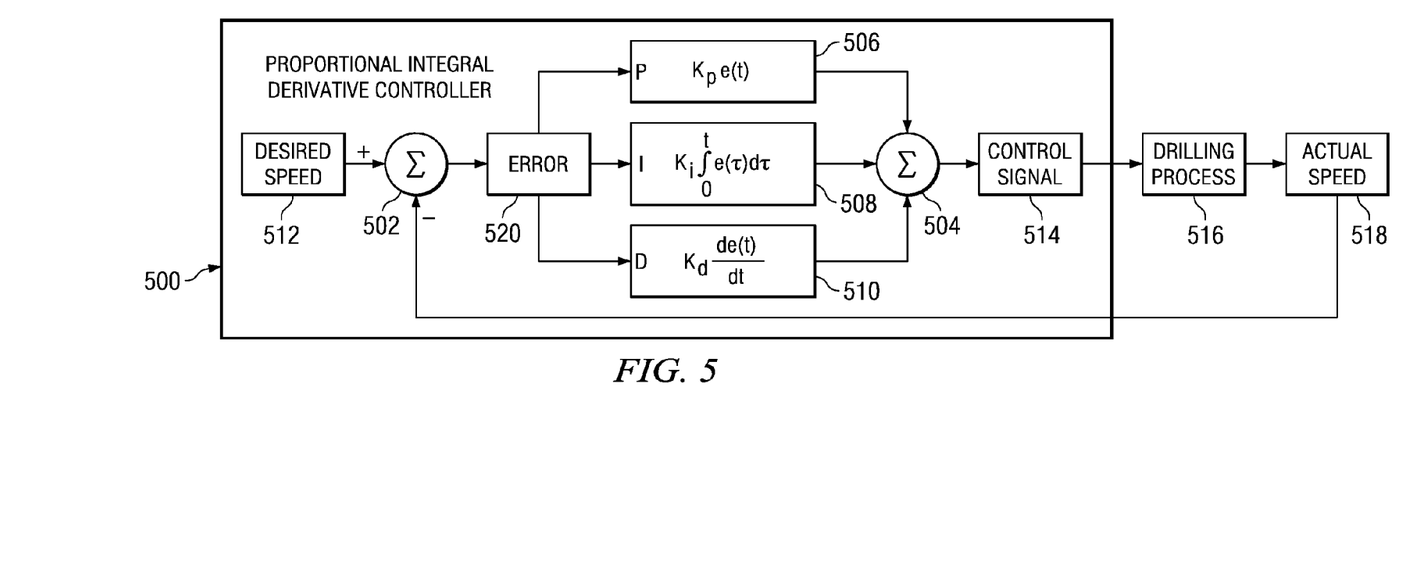
FIG. 5 is an illustration of a proportional integral derivative controller in accordance with an advantageous embodiment.

With reference now to FIG. 5, an illustration of a proportional integral derivative controller is depicted in accordance with an advantageous embodiment. Proportional integral derivative controller 500 may be an example implementation of proportional integral derivative controller 412 within controller 400 in FIG. 4. In this example, proportional integral derivative controller 500 is a control feedback mechanism that may be used to control the drilling speed of a drilling apparatus.

Proportional integral derivative controller 500 includes summing unit 502, summing unit 504, proportional term unit 506, integral term unit 508, and derivative term unit 510. Summing unit 502 receives desired speed 512 as used to generate control signal 514.

Control signal 514 is sent to drilling process 516 which generates actual speed 518 as an output. Actual speed 518 may be identified as encoder counts per second. Drilling process 516 in these examples includes, for example, without limitation, operations performed using spindle 314 and rotary sensor 312 in FIG. 3. Rotary sensor 312 generates data identifying actual speed 518, which is returned to summing unit 502.

In these examples, actual speed 518 is subtracted from desired speed 512 to generate error 520. Error 520 is identified based on the difference between the actual encoder counts per second and the desired encoder counts per second. These encoder counts per second are a measurement of speed in these examples. Error 520 is used by at least one of proportional term unit 506, integral term unit 508, and derivative term unit 510 to generate control signal 514. As used herein the phrase "at least one of" when used with a list of items means that different combinations one or more of the items may be used and only one of each item in the list may be needed. For example, "at least one of item A, item B, and item C" may include, for example, without limitation, item A or item A and item B. This example also may include item A, item B, and item C or item B and item C.

Proportional term unit 506 may make a change to actual speed 518 that may be proportional to the current value of error 520. This proportional response may be adjusted by multiplying the error by a constant referred to as proportional gain. Integral term 508 may generate a value proportional to both the magnitude of the error and the duration of the error. In the different advantageous embodiments, integral term 508 may be set equal to zero. By setting integral term 508 equal to zero, the observed error, error 520, may be used for any portion of the drilling process.

Derivative term unit 510 may generate a contribution to control signal 514 that may be a rate of change of the processed error calculated by determining the slope of the error with time. The output from proportional term unit 506, integral term unit 508, and derivative term unit 510 may be summed by summing unit 504 to generate control signal 514 in these examples.

Error 520 may be a single value used by proportional integral derivative controller 500 to determine whether the drilling apparatus is operating at the proper speed. In these examples, this speed may be defined using encoder counts per second. Proportional integral derivative controller 500 makes corrections to the speed independently based on this error.

An average value for error 520 also may be generated. This value may be used as a base or reference. This base or reference may be obtained at the beginning of the drilling process and/or at the beginning of entering a new layer within a stackup. Proportional integral derivative controller 500 may calculate an average error from error 520. The time may be the amount of drilling time needed to penetrate a material until the tip of the drill bit is fully in the material and is calculated by (½ drill diameter×tan (22.5 deg)) /(revolution per minute (RPM)×inches per minute (IPR) feed rate). This calculation may be based on a 135 degree point geometry drill. The calculation and/or formula may be adjusted for other point angles and/or configurations. The value for the base value may then be used in calculations to determine the next layer by comparing the base to error 520.

In this manner, accounting for changes in torque and thrust due to wear in the drill bit and/or other components may be taken into account continuously. As the drill bit becomes worn, the average encoder error as well as instantaneous encoder error may become higher in each layer. The comparisons performed in these examples may be a comparison of the average encoder error of the previous layers to the instantaneous encoder error of the current layer. In this manner, the different advantageous embodiments may identify a transition from the current layer to the next layer no matter how dull the drill bit may become.

The illustration of proportional integral derivative controller 500 in FIG. 5 is provided for purposes of illustrating one manner in which a control system or process may be integrated in a controller such as, for example, without limitation, controller 400. This illustration is not meant to provide architectural or other limitations to the manner in which a controller may be implemented according to the different advantageous embodiments.

Figure 6:
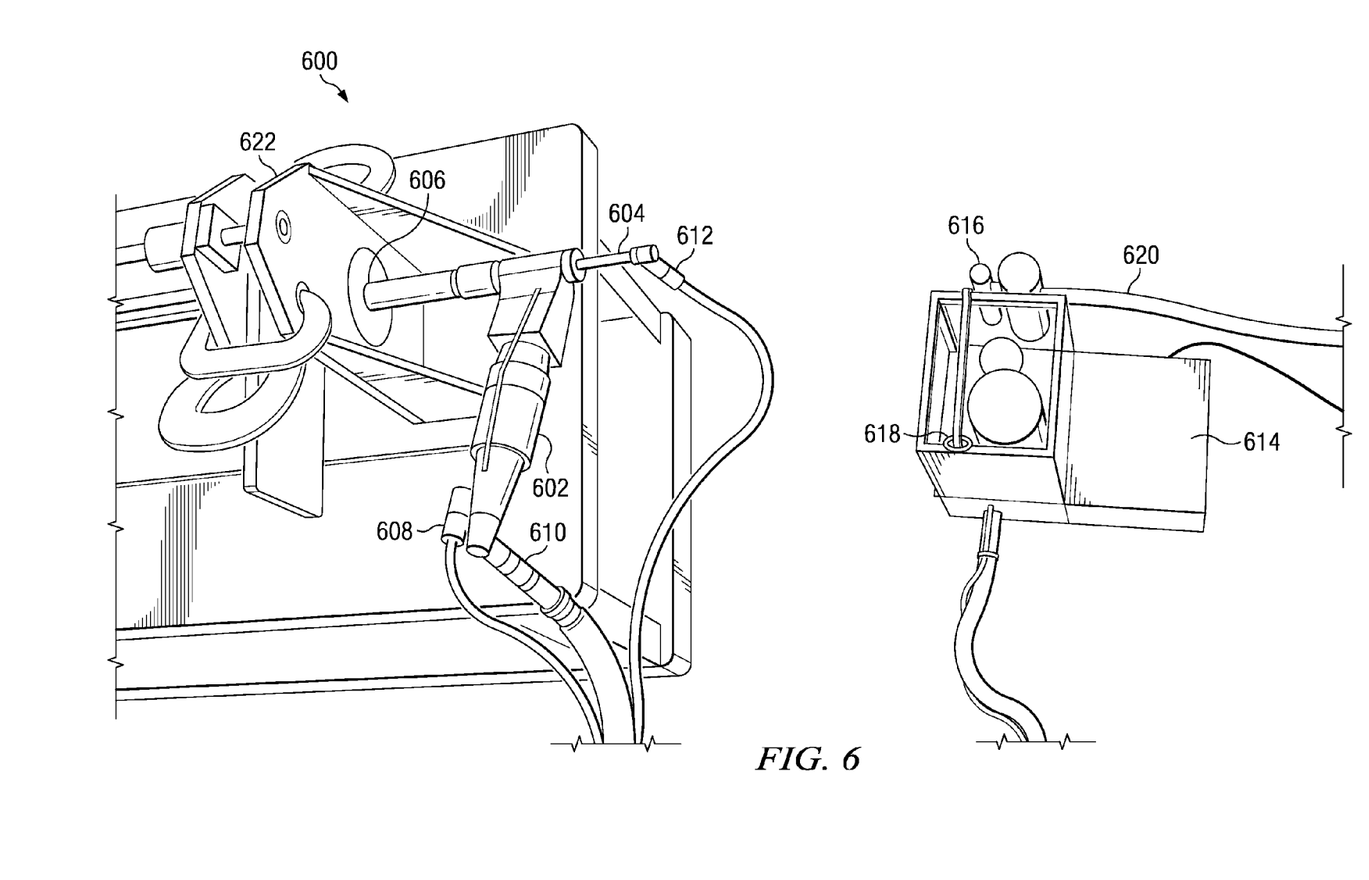
FIG. 6 is a diagram of a drilling apparatus in accordance with an advantageous embodiment.

With reference now to FIG. 6, a diagram of a drilling apparatus is depicted in accordance with an advantageous embodiment. In this example, drilling apparatus 600 is an example of one implementation of drilling apparatus 300 in FIG. 3. Of course, this illustration of drilling apparatus 600 is provided for purposes of illustrating a particular implementation and is not meant to imply physical and/or architectural limitations on other advantageous embodiments.

In this example, drilling apparatus 600 may include air motor 602, spindle 604, drill bit 606, sensor connection 608, air supply connection 610, lubrication connection 612, controller 614, proportional flow valve 616, lubrication unit 618, and air hose 620. Proportional flow valve 616 is connected to air hose 620 and air supply connection 610. Air hose 620 provides air from an air supply unit, which is not shown in this example. Air supply connection 610 may connect to air motor 602. Rotary sensor connection 608 may provide a connection between a rotary sensor, not shown in this example, within spindle 604 and controller 614. Holder 622 may hold drill bit 606 and spindle 604 in a position for performing drilling operations.

In these examples, controller 614 may control the amount of air supplied to air motor 602 by controlling proportional flow valve 616. Further, controller 614 may control the delivery of lubrication to drill bit 606 by controlling lubrication unit 618.

Figure 7:
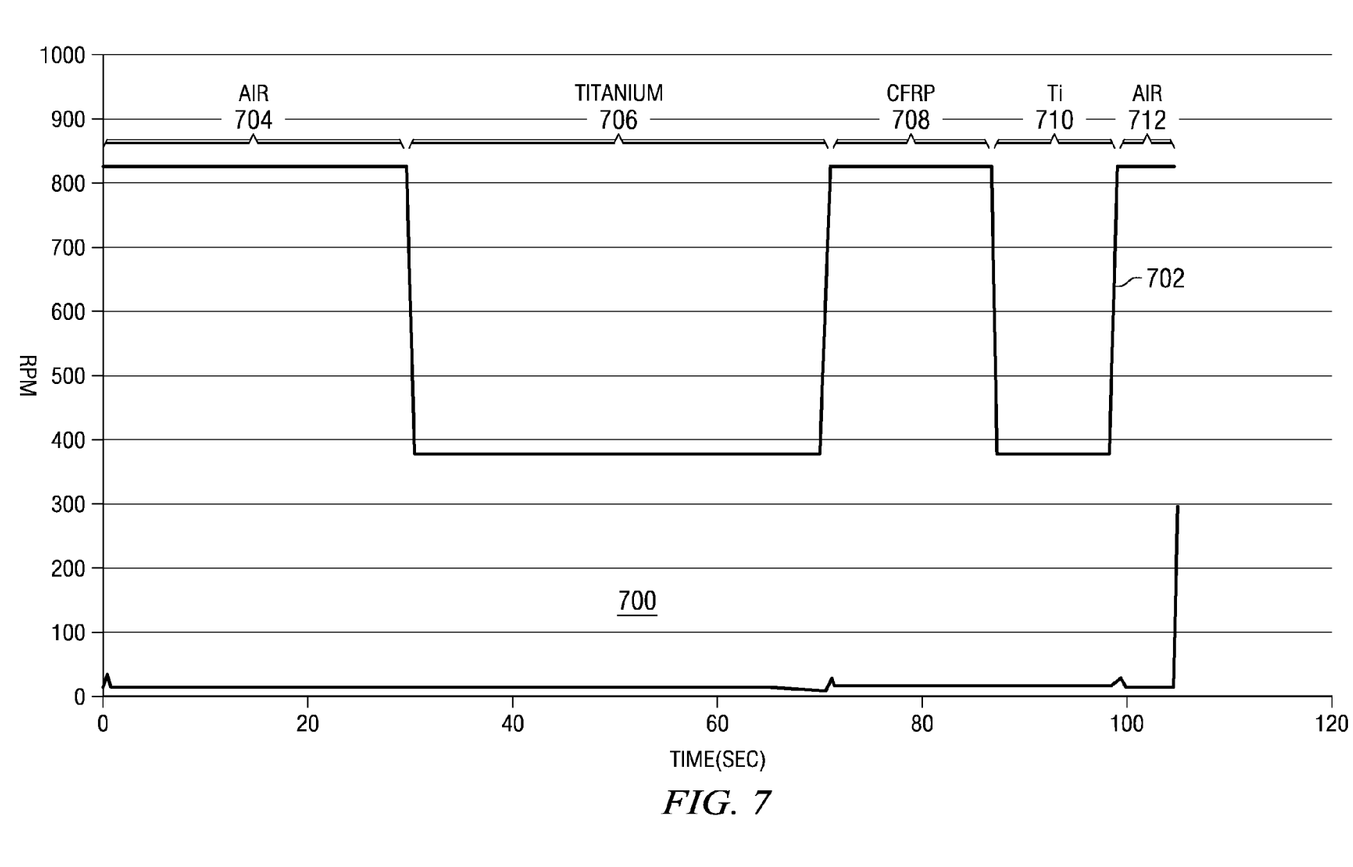
FIG. 7 is a diagram illustrating changes in speed that are detected by drilling operation in accordance with an advantageous embodiment.

With reference now to FIG. 7, a diagram illustrating changes in speed that are detected by drilling operation is depicted in accordance with an advantageous embodiment. In this example, the x-axis may represent time, while the y-axis may represent drilling speed in graph 700. In these examples, the drilling speed may be in revolutions per minute.

In this example, line 702 in graph 700 represents the drilling speed that may be encountered in drilling a stackup containing, for example, without limitation, a carbon fiber reinforced plastic layer and a titanium layer.

Section 704 may illustrate the drilling speed encountered with air, the drill speed prior to drilling. This drilling speed may be detected before the drill bit encounters the stackup. Section 706 may show the drilling speed in a titanium layer. Section 708 may illustrate the drilling speed when a carbon fiber reinforced layer is encountered, and section 710 may show the drilling speed when another titanium layer is encountered. Air may be encountered a second time when a hole has been drilled through the entire stackup or when an air layer within the stackup is encountered.

In this example, a change in error may occur when the drill bit transitions from a carbon fiber reinforced plastic layer to the titanium layer as shown between sections 708 and 710. In this example, a drop in drilling speed may occur. A drop in drilling speed may result in a proportional increase in error as the controller attempts to compensate for the slowing rotation by increasing the voltage applied to the proportional control valve to reach a threshold value required to detect the next layer.

When the drilling apparatus drills through the titanium layer and reaches the air again, the drill speed after exiting the stackup, the drilling speed may increase as indicated in section 712. An increase in rotation speed may be quickly detected by the controller. This increase may result in the decrease in the voltage to the proportional flow valve. This decrease in the voltage may maintain the required or desired rotation. Additionally, the decrease in voltage also may decrease the error until the proper threshold value is reached to detect another layer within the stackup.

In the different advantageous embodiments, the depicted error may be compared with a base. In these advantageous embodiments, the base may be, for example, without limitation, an average error generated from a set of error values. During the drilling operation, the error may be compared with the base to provide an indication of drill loading and/or the amount of work being performed by the drilling apparatus.

Figure 8:
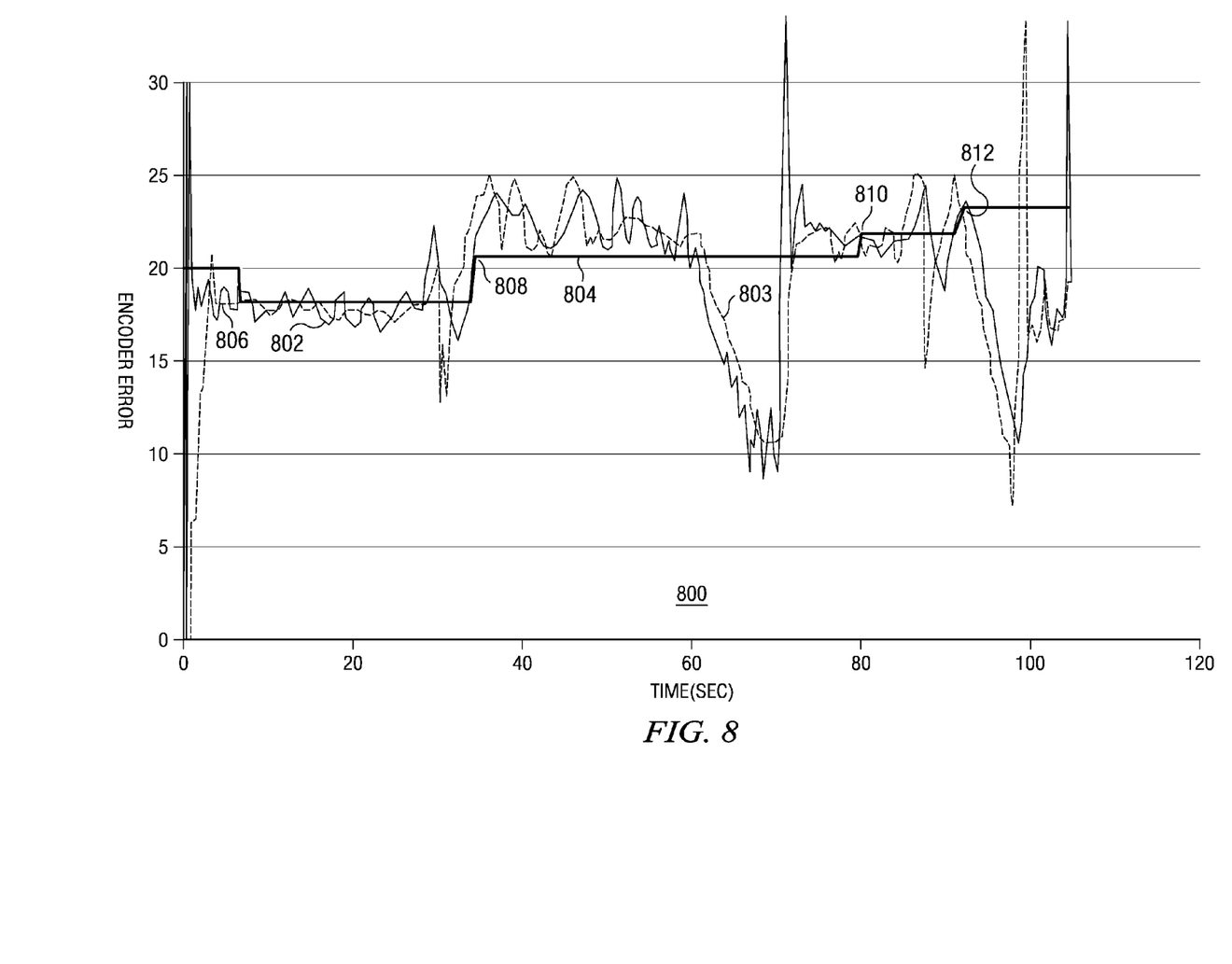
FIG. 8 is a diagram illustrating recording of base values in accordance with an advantageous embodiment.

With reference now to FIG. 8, a graph illustrating recording of base values is depicted in accordance with an advantageous embodiment. In these examples, the base value may be used as comparison to the detected error. This comparison may be used to determine whether the drill bit has moved from one layer to another layer in the stackup.

In this illustrative example, line 800 in graph 802 illustrates when values maybe recorded as base values for identifying changes in layers. Line 803 represents an average error. In these examples, the current or instantaneous error is an encoder error while the average error is an average encoder error. The average encoder error identified by line 803 may be an average of thirty samples in these examples.

A reading maybe taken at point 806 after the drilling apparatus has been rotating in air for around six seconds. Of course, other periods of time may be used other than six seconds. For example, three seconds may be used. The amount of time before taking a reading may be selected based on the time that is believed to be required to stabilize the error. When the drilling apparatus starts, a wide variation of error may be detected as well as the base. The delay to take a reading until point 806 may allow for these variations to decrease and/or disappear. In these examples, the reading of point 806 may occur around six seconds after the drill has been operating in air. Line 804 illustrates a base. The values for the base are average values for error that may be generated from the error detected by the controller.

A second reading for a base may be taken after three seconds of drilling within the carbon fiber reinforced plastic layer as shown at point 808. These readings may be used to calculate a base for the carbon fiber reinforced layer. A recording of the third base value may be taken at point 810. Also, a recording of a fourth base value may be recorded at point 812. These recordings are based on a delay that may be calculated as follows: (½ diameter×tan (22.5))/(revolutions per minute×inches per revolution) seconds.

The base in line 804 may be recorded each time the drill bit enters a new layer in the stackup. This recording of a new base may occur even if the layer is the same type of layer as the previous layer farther along in the stackup. For example, if the first layer is a carbon fiber reinforced plastic layer, the second layer is a titanium layer, and the third layer is a carbon fiber reinforced plastic layer, a base may be recorded for each of the carbon fiber reinforced plastic layers. By recording a new base for each layer, changes in the drilling apparatus for particular speeds may be taken into account.

These changes may include, for example, without limitation, wear in the spindle, wear in the drill bit, and/or other suitable conditions that may change the actual speed. With these base values, comparisons may be made to an error signal to determine when a new layer has been encountered.

In this manner, the recording of new base values on a continuous basis during the drilling of a layer or when a new layer is encountered may be used to automatically compensate for wear and/or other changes in the conditions in the drilling apparatus. For example, without limitation, when a drill bit becomes more dull, this change in the base may be used to detect when the drill bit becomes unusable. With this feature, the different advantageous embodiments may stop the drilling process to prevent damage to a part.

Figure 9:
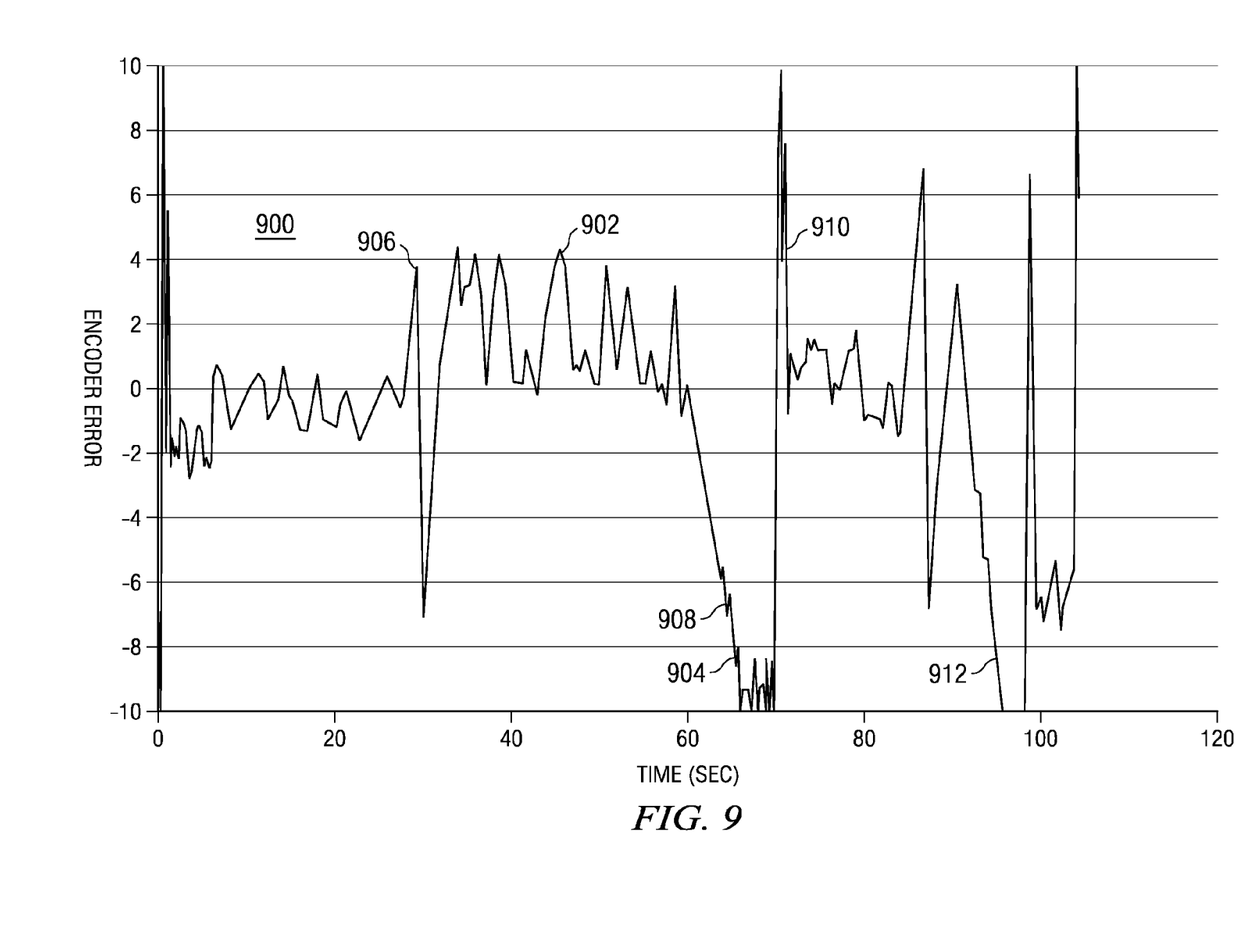
FIG. 9 is a diagram illustrating detecting layers within a stackup in accordance with an advantageous embodiment.

With reference now to FIG. 9, a diagram illustrating detecting layers within a stackup is depicted in accordance with an advantageous embodiment. In this example, the x-axis may represent time, while the y-axis may represent error in graph 900. The error count in the y-axis may be the difference between the detected error at a particular point in time and a base. This base may also be referred to as a base value.

In this example, line 902 in graph 900 may represent a difference between the detected error and/or the base. Line 904 may show the average error minus the current error. These two signals illustrated in line 902 and line 904 may be used to make decisions in the drilling process. In this example, a trigger may be present when the difference between the current error and a base or other reference error is greater than four. As can be seen in this example, first trigger 906, second trigger 908, third trigger 910, and fourth trigger 912 may be present.

First trigger 906 may be present in a titanium layer, while second trigger 908 may indicate the presence of a carbon fiber reinforced plastic layer. Third trigger 910 may represent another titanium layer, while fourth trigger 912 may represent the drill bit entering air.

A recognition or identification of a titanium layer such as, for example, without limitation, titanium layer 352 in stackup 346 in FIG. 3 may be made as a difference between the base and the error as the error rises above four counts as shown around point 906. In each of these examples in FIG. 9, the threshold value for the difference in error may be four. As can be seen, a difference, rather than an absolute value of error may be used to determine when a new layer has been encountered.

The illustration of these thresholds is provided for purposes of depicting one manner in which different layers may have been encountered during a drilling operation. Of course, other threshold levels may be used depending on the particular implementation. For example, the difference of six counts, ten counts, and/or seventeen counts may be used to indicate when a new layer has been encountered. Further, different thresholds may be used for different layers depending on the particular implementation.

Figure 10:
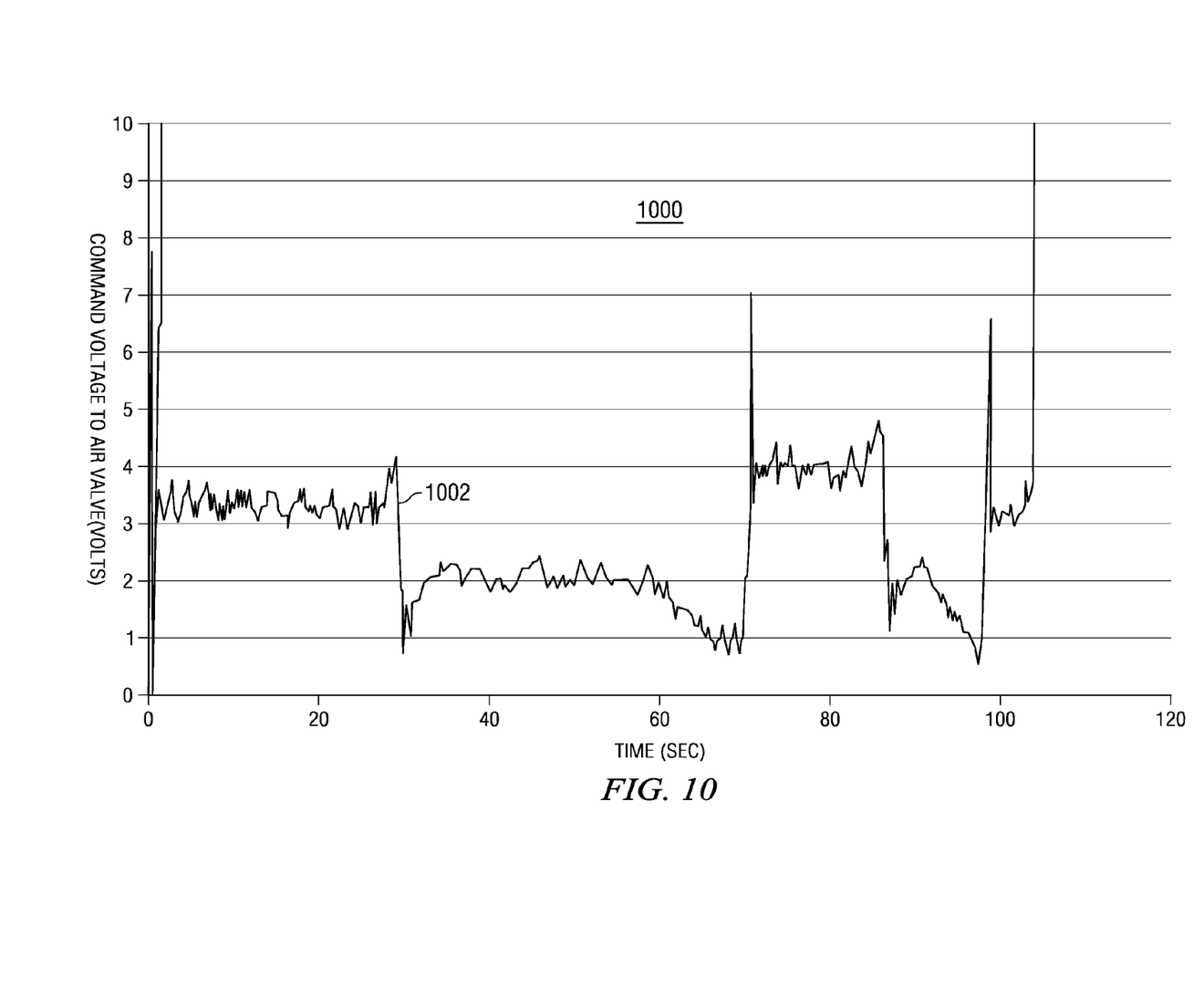
FIG. 10 is a diagram illustrating a control signal in accordance with an advantageous embodiment.

With reference now to FIG. 10, a diagram illustrating a control signal is depicted in accordance with an advantageous embodiment. In graph 1000, the x-axis represents time, while the y-axis represents the voltage in volts. In this example, line 1002 in graph 1000 is an example of a control signal that may be generated by a controller to control the speed at which a spindle and/or drill bit turns in a drilling apparatus. This control signal may be, for example, without limitation, control signal 354 in FIG. 3. This signal may be used to control a proportional air valve such as, for example, without limitation, proportional flow valve 330 in FIG. 3.

As the voltage increases in line 1002 the proportional flow valve opens more to provide more airflow to the air motor. As the voltage decreases, the proportional flow valve closes to reduce the amount of air supplied to the air motor.

Figure 11:
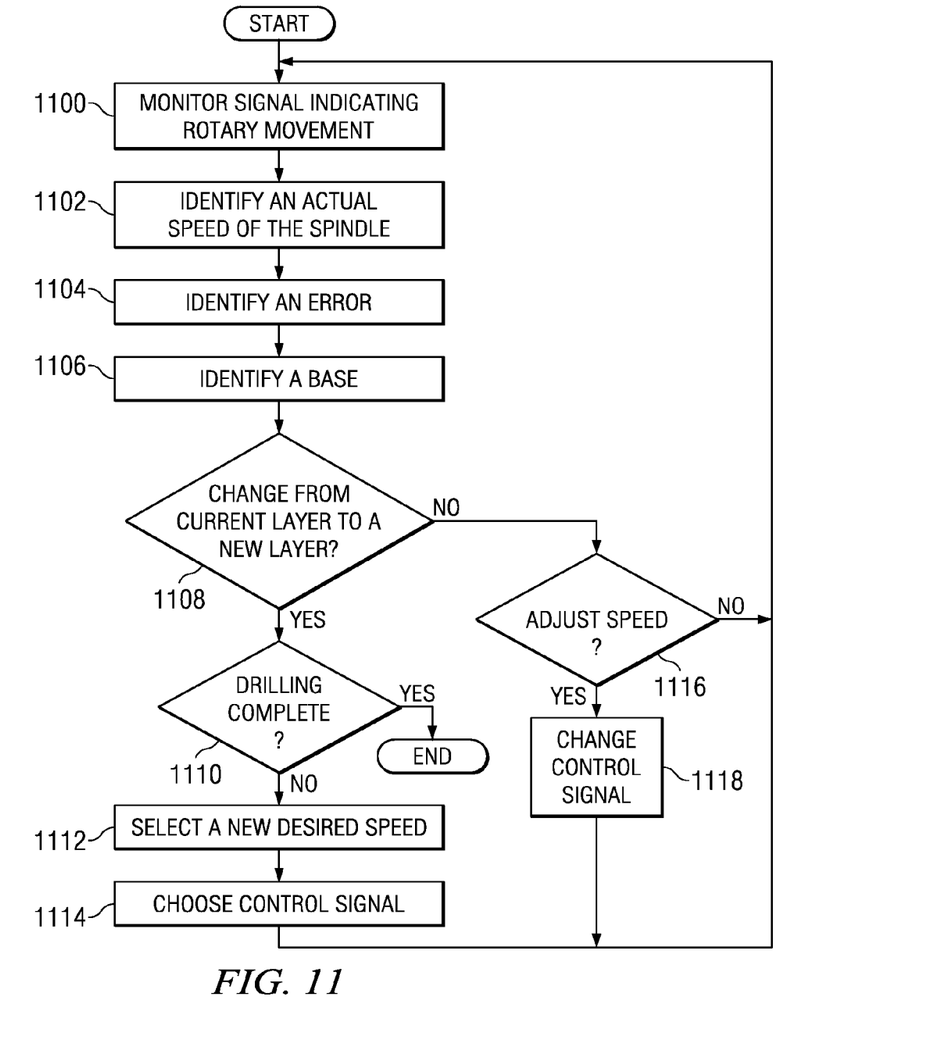
FIG. 11 is a high level flowchart of a process for performing a drilling operation in accordance with an advantageous embodiment.

With reference now to FIG. 11, a high level flowchart of a process for performing a drilling operation is depicted in accordance with an advantageous embodiment. The process in FIG. 11 may be implemented using a drilling apparatus such as, for example, without limitation, the drilling apparatus 300 in FIG. 3. In particular, these different operations may be performed by executing program code or instructions in a controller such as, for example, without limitation, controller 400 in FIG. 4.

The process begins by monitoring a signal indicating rotary movement (operation 1100). This signal may identify the speed of a component in the drilling apparatus such as, for example, without limitation, the spindle and/or drill bit. In these examples, a signal may be generated by a rotary sensor coupled to the spindle. The process then identifies an actual speed of the spindle from the signal (operation 1102). Of course, in other advantageous embodiments operation 1102 may be used to identify a speed of the drill bit or other tool based on the speed and/or location of the spindle.

The process may then identify an error (operation 1104). In operation 1104, the error may be a difference between the actual speed of the spindle system and the desired speed for the spindle. This error is the error currently detected and may be also referred to as a current error. The process may identify a base (operation 1106). This base may be an average of a set of error values identified from the speed of the spindle. This base also may be referred to as an average error. This error may be identified once each time a new layer is encountered or may be performed continuously using the most recent set of error values. In these examples, the current error and average error may be encoder error values.

A determination may be made as to whether a change has occurred from drilling in the current layer to a new layer (operation 1108). This change may be made by identifying the difference between the drilling speeds. The change in drilling speeds may be identified through an error as described above. In particular, the base may be subtracted from the detected error and a determination may be made as to whether the difference is greater than the target level for the current layer.

If a change from the current layer to a new layer is identified, a determination is made as to whether the drilling is complete (operation 1110). If the drilling is complete, the process terminates. Otherwise, the process may select a new desired speed for the new layer (operation 1112). The process then may generate a control signal for the proportional flow valve (operation 1114) with the process returning to operation 1100.

With reference again to operation 1108, if a change from the current layer to a new layer has not been identified, a determination is made as to whether an adjustment is needed to the speed (operation 1116). If an adjustment to the speed is needed, the process then changes the control signal (operation 1118) with the process then returning to operation 1100 as described above. If an adjustment to the speed is not needed, then the process then returns to operation 1100 without changing the control signal. In these examples, an adjustment to speed may occur if change in the drilling apparatus occur altering the actual speed from the desired speed when a change in layers has not occurred.

Figure 12:
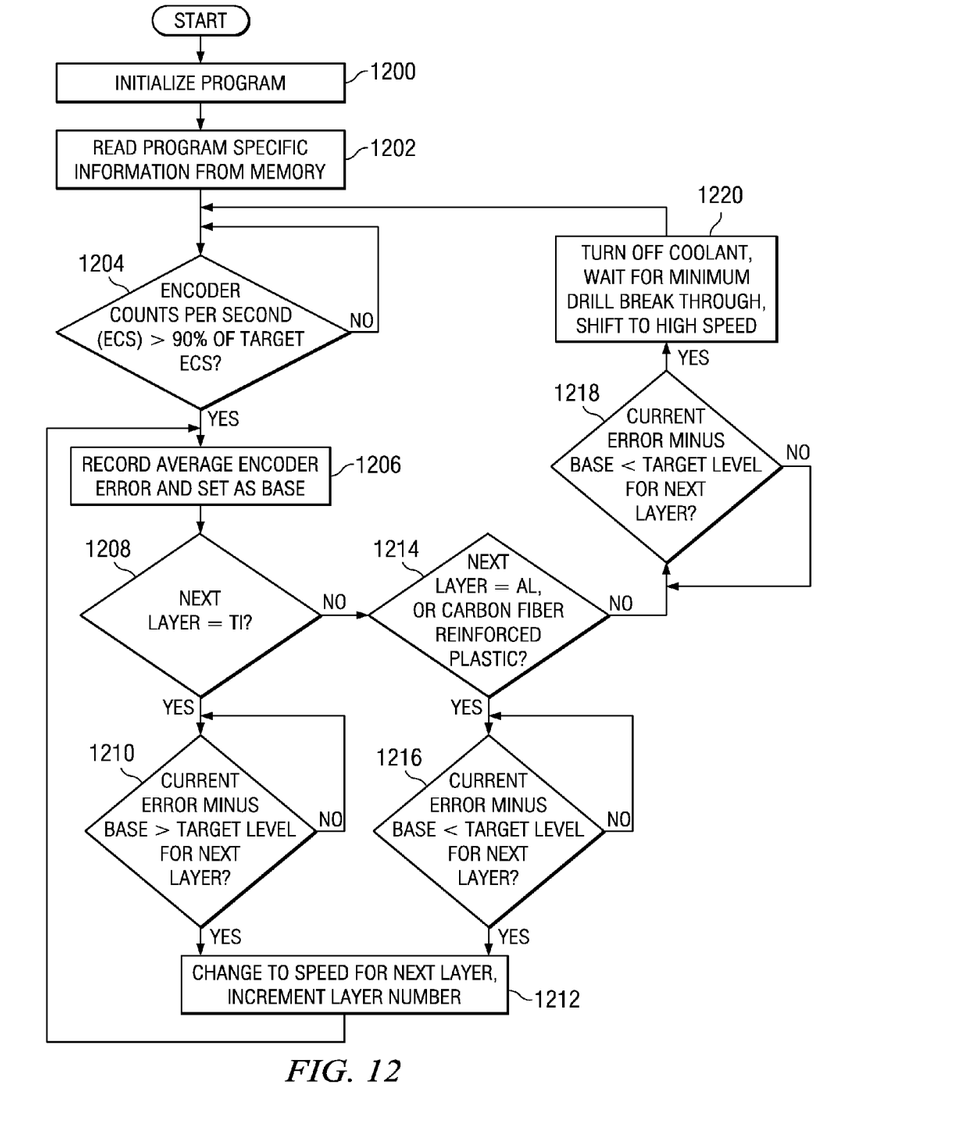
FIG. 12 is a flowchart of a process for performing a drilling operation in accordance with an advantageous embodiment.

With reference now to FIG. 12, a flowchart of a process for performing a drilling operation is depicted in accordance with an advantageous embodiment. FIG. 12 is another example of a drilling operation that may be performed using a drilling apparatus such as, for example, without limitation, drilling apparatus 300 in FIG. 3.

The process begins by initializing execution of the program (operation 1200). The program may be, for example, without limitation, program 409 in FIG. 4. In this example, the program may be initialized within a controller such as, for example, without limitation, controller 400 in FIG. 4.

Next, the process may read program specific information from the memory (operation 1202). This program for specific information may include, for example, an identification of layers within a stackup to be drilled, desired drilling speeds for the different layers, and other suitable information.

The process then determines whether the encoder counts per second is greater than around 90 percent of the target encoder counts per second (operation 1204). If the encoder counts per second is not greater than around 90 percent of the target encoder counts per second, the process continues to loop back or return to operation 1204. Operation 1204 may determine whether the motor for the drill is turning. The control process begins when the drill motor rotates at greater than around 90 percent of the target speed in these examples. Of course, other percentages may be used depending on the particular implementation.

If the encoder counts per second are greater than around 90 percent of the target encoder counts per second, the process may record an average encoder error and may set this average error as the base (operation 1206). A determination may be made as to whether the next layer is a titanium layer (operation 1208).

If the next layer is a titanium layer, a determination may be made as to whether the current error minus the base is greater than the target level for the next layer (operation 1210). If the current error minus the base is not greater than the target level for the next layer, the process may return to operation 1210. The current error may be an error based on the current speed of the drill bit processed with the desired speed of the drill bit through a controller. If the current error minus the base is greater than the target level for the next layer, the process may then change the drilling speed to the speed for the next layer (operation 1212) with the process then returning to operation 1206 as described above.

With reference again to operation 1208, if the next layer is not titanium, a determination may be made as to whether the next layer is aluminum or carbon fiber reinforced plastic (operation 1214). In other words, operation 1214 may determine whether the next layer is softer than the titanium layer.

If the next layer is aluminum or carbon fiber reinforced plastic, the process may determine whether the current error minus the base is less than a target level for the next layer (operation 1216). If the current error minus the base is not less than the target level for the next layer, the process may return to operation 1216. When the current error minus the base is less than the target level for the next layer, the process may proceed to operation 1212 as described above.

With reference again to operation 1214, if the next layer is not aluminum or carbon fiber reinforced plastic, the process may determine whether the current error minus the base is less than the target level for the current layer (operation 1218). If the current error is not less than the target level for the current layer, the process may continue to loop or return to operation 1218. If the current error minus the base is less than the target level for the next layer, the process may turn off the coolant, wait for minimum drill breakthrough, and/or shift to high speed (operation 1220) with the process then returning to operation 1204.

In these examples, the process illustrated in FIG. 12 may be terminated mechanically when the drill motor is turned off. The process returns to operation 1204 and continues to loop until the drill motor is turned back on or the power is shut off for the process. In operation 1208, a determination may be made as to whether the next layer is a hard layer such as titanium. Of course, in other advantageous embodiments other materials may be used as a hard material. For example, without limitation, other materials may be titanium, steel alloys, or other suitable materials.

In operation 1214, this next layer may be considered a soft layer. In other advantageous embodiments, other materials other than aluminum and carbon reinforced plastic may be considered soft layers. For example, without limitation, fiberglass or other plastic materials also may be considered a soft material in the next layer in operation 1214.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different advantageous embodiments provide a method, apparatus, and computer usable program code for performing drilling operations. In one advantageous embodiment as described above, an apparatus may include a motor, a rotary sensor, and a controller connected to the rotary sensor. The rotary sensor is capable of generating a signal in response to rotary movement of a spindle controller is capable of controlling the speed of the motor from the signal generated by the rotary sensor and is capable of identifying a change from the current layer in a stackup to new layer in the stackup using the signal. The controller also is able to select a new or different speed for the spindle based on detecting the new layer.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples such as modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A drilling apparatus comprising:
   a rotary sensor, wherein the rotary sensor is configured to generate a signal in response to rotary movement of a spindle connected to a motor; and
   a controller connected to the rotary sensor;
      wherein the controller is configured to monitor a speed of the motor from the signal generated by the rotary sensor and is configured to identify a change from a current layer in a stackup to a new layer in the stackup using the signal; and
      wherein the controller is further configured to identify a difference between a current error and an average error and is configured to identify a change from the current layer in the stackup to the new layer in the stackup based on the difference.

2. The drilling apparatus of claim 1, wherein the controller is configured to identify the change from the current layer in the stackup to the new layer in the stackup based on the current error and a base for the difference.

3. The drilling apparatus of claim 1, wherein the controller comprises a proportional-integral-derivative controller.

4. The drilling apparatus of claim 1 further comprising:
a drill bit connected to the spindle.

5. The drilling apparatus of claim 4, wherein the drill bit is configured to receive lubrication and pass the lubrication into a drilling area and further comprising:
a lubrication unit configured to supply the lubrication to the drill bit and configured to be controlled by the controller.

6. The drilling apparatus of claim 1, wherein the rotary sensor comprises:
a hall effect transistor; and
a set of magnets coupled to the spindle.

7. The drilling apparatus of claim 1, wherein the current layer is a carbon fiber layer and the new layer is a titanium layer.

8. The drilling apparatus of claim 1, wherein the motor comprises an air motor and wherein the drilling apparatus further comprises:
an air supply unit connected to the air motor and configured to power the air motor.

9. A drilling apparatus for drilling a stackup, the drilling apparatus comprising:
an air motor;
an air supply unit connected to the air motor, wherein the air supply unit is configured to power the air motor;
a rotary sensor comprising a hall effect transistor and a set of magnets wherein the rotary sensor is configured to generate a signal in response to a rotary movement of a drill motor and is configured to detect the rotary movement in revolutions per minute;
a proportional flow valve located in the air supply unit and connected to a controller;
a proportional-integral-derivative controller connected to the rotary sensor and the proportional flow valve, wherein the proportional-integral-derivative controller is configured to monitor a speed of the air motor from the signal generated by the rotary sensor, identify an error between an actual speed of the air motor and a desired speed of the air motor, identify a change from a current layer in a stackup to a new layer in the stackup based on the error and a base value for the error, and control the proportional flow valve in the air supply unit to change the actual speed towards the desired speed;
a spindle connected to the air motor;
a drill bit connected to the spindle; and
a lubrication unit configured to supply lubrication to the drill bit and configured to be controlled by the proportional-integral-derivative controller.

* * * * *